United States Patent [19]
Viola et al.

[11] 3,873,168
[45] Mar. 25, 1975

[54] LAMINATED COMPOSITE ARTICLE WITH IMPROVED BEARING PORTION

[75] Inventors: Olivo L. Viola; Wilbert H. Smith, both of Cincinnati, Ohio

[73] Assignee: General Electric Company, Cincinnati, Ohio

[22] Filed: Dec. 18, 1972

[21] Appl. No.: 315,884

[52] U.S. Cl. ............... 308/238, 308/237 R, 161/60, 161/109, 161/182, 161/184
[51] Int. Cl. ........................................... F16c 33/00
[58] Field of Search........... 308/237 R, 238; 161/60, 161/109, 110, 112, 182, 184, 185

[56] References Cited
UNITED STATES PATENTS

| | | | |
|---|---|---|---|
| 3,070,408 | 12/1962 | Reuter | 308/238 |
| 3,198,691 | 8/1965 | Thomas et al. | 161/184 |
| 3,203,849 | 8/1965 | Katz et al. | 161/185 |
| 3,424,503 | 1/1969 | Schulz | 308/238 |
| 3,649,435 | 3/1972 | Varlas | 161/182 |

Primary Examiner—William J. Van Balen
Assistant Examiner—William R. Dixon, Jr.
Attorney, Agent, or Firm—Derek P. Lawrence; Lee H. Sachs

[57] ABSTRACT

A composite article having a body of at least one layer of glass fibers includes a pair of opposed outer bearing portions connected with the body, at least one outer bearing portion including ingredients of graphite, carbon or their mixtures, such as in fiber form, to provide improved bearing characteristics. The article is bonded together through a polymer resin. In one form, the article includes a low coefficient of friction material at least as a coating on the bearing portion, especially for very thin, lightweight bearing designs.

5 Claims, 4 Drawing Figures

PATENTED MAR 25 1975 3,873,168

1

LAMINATED COMPOSITE ARTICLE WITH IMPROVED BEARING PORTION

BACKGROUND OF THE INVENTION

The invention herein described was made in the course of or under a contract, or a subcontract thereunder, with the United States Department of the Air Force.

This invention relates to laminated composite articles primarily of woven fibers impregnated with a polymer resin. More particularly, it relates to such an article having a combination of improved bearing portion wear resistance and improved characteristics of body strength.

In certain power producing apparatus such as gas turbine engines, there are a number of components which bear and rotate one on the other. For example, most modern gas turbine engines include in the compressor or fan, or both, stator vanes which are movable about an axis. Because of the pressure developed in such apparatus, the interface between the movable vane and a static component carrying the vane is subjected to substantial pressures. In addition, some components operate at temperatures substantially increased over that of the surrounding atmosphere.

In order to avoid wear between such interface surfaces, one moving in respect to the other, treated spacers, such as washers and bushings, have been used. For example, in relatively broad use are glass cloth washers and bushings treated with polytetrafluoroethylene material. However, as wear occurs on the bearing surfaces and the glass fibers are exposed to the moving surface, significant resistance to movement results with subsequent failure of the bearing material.

As the operating conditions of such gas turbine engines have become more strenuous, both in respect to loading and temperature, wear, tearing and general deterioration of such bushings have been observed within the period of time such bushings or washers are normally intended to operate. Cracking, particularly in molded, homogeneous materials, followed by incipient delamination of the part, in laminated parts, in adjacent areas have resulted in complete loss of such elements.

SUMMARY OF THE INVENTION

It is a principal object of the present invention to provide an improved laminated composite article having an improved bearing portion for operation under strenuous conditions of loading and temperature.

Another object is to provide such an article having within its structure elements which impart both strength and lubricity to the article's bearing portion.

These and other objects and advantages will be more fully understood from the following more detailed description, examples and the drawing, all of which are intended to be representative, rather than limiting on, the scope of the present invention.

Briefly, the improved laminated composite article of the present invention includes a body of at least one layer of glass fibers and a pair of opposed outer bearing portions, at least one of which includes therethrough either carbon or graphite, or both. Preferably, such ingredients are in the form of fibers. More particularly, the fibers are preferably oriented substantially parallel to a bearing surface of the article's bearing portion in which they are included. Impregnating the body and the bearing portions, and bonding them together, is a matrix of a polymer resin. Examples of the resin, for higher temperature capability, include epoxy and polyimide type resins.

In another form of the invention, a low coefficient of friction material, for example $MoS_2$, $WS_2$, mica, boron nitride or their mixtures, is included as a filler for the resin, or at least as a surface coating, on a bearing portion outer surfact to maintain lubricity in the article during wear of its bearing portion or portions.

DESCRIPTION OF THE PREFERRED EMBODIMENTS

Through provision in the article of the present invention of graphite, carbon or their mixtures in the outer bearing portion of the article, on that bearing surface which is intended to cooperate in movement, problems resulting from wear of known composite articles including bearing surfaces are substantially eliminated. For example, the primary mode of failure of a woven glass cloth treated with polytetrafluoroethylene material as the anti-friction lubricant was the seizing of the glass substrate after wear occurred through the surface. Such seizing was coupled with lapping and sizeable increases in resistance. Provision of a low coefficient of friction material as the outer bearing portion or portions of the composite article intended to cooperate in movement provides in such bearing portion, and hence at its operating surface, an anti-friction material even though the original surface has been worn. One form of the article of the present invention provides, in addition, a bearing portion filler or coating of another low coefficient of friction material selected from $MoS_2$, $WS_2$, mica, BN or their mixtures at least as an initial wearing surface. When such material is used as a filler, the article is protected further from wear from within.

Figure 1:
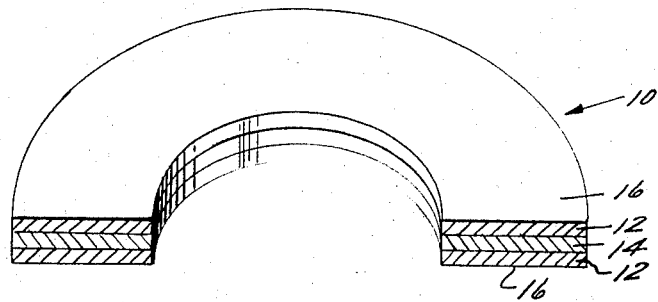
FIG. 1 is an isometric sectional view of one form of the composite article of the present invention in the form of a washer.
Figure 2:
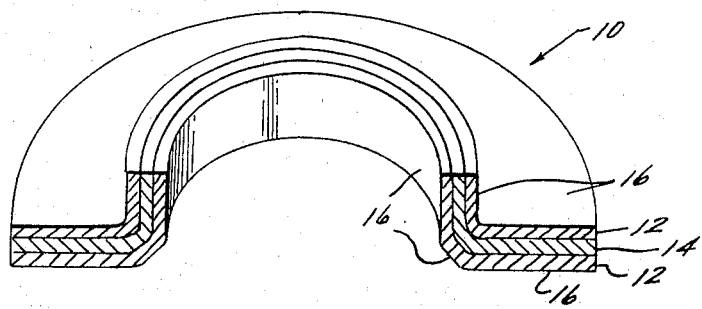
FIG. 2 is an isometric sectional view of the composite article of the present invention in the form of a bushing.

FIGS. 1 and 2 of the drawing present sectional isometric views of two preferred forms of the present invention including a plurality of laminations. Referring to FIG. 1, the article, shown generally at 10 in the form of a washer, includes a pair of outer bearing portions 12 and a body 14. The body or lamination 14 is glass fiber, such as cloth, to provide additional strength to the washer. The glass fiber keeps the graphite fibers in place, even after any wear or cracking may occur in the resin binder. The two outer bearing portions or laminations 12 in this preferred embodiment are woven graphite fibers and oriented substantially parallel to bearing portion outer surface 16 to minimize friction between such surface and a mating component during wear of outer layer 12.

A more complex article 10 made according to the present invention is shown in the form of a bushing in FIG. 2. In such a case, the bearing portion 12 is of a more complex configuration and of a type which might be used in a variable stator assembly in the compressor of a gas turbine engine. Such a configuration can be obtained by pressing and molding the article in an appropriately shaped die by methods well known in the art. Application of the bushing of FIG. 2 is shown in more detail in FIG. 4.

One example of the manufacture of the bushing of FIG. 2 involved the preparation of a layer of woven glass and a pair of layers of woven graphite. The layers were first impregnated at room temperature with resin. Each of the layers or laminations was about 0.006–0.008 inch in thickness, the graphite being a fabric of 8 harness 181 weave. The resin selected particularly for higher temperature operation was a polyimide type thermosetting resin with limited evolution of volatile by-products during preforming or curing. Such types are commercially available from several sources.

After impregnation, each lamination was partially cured, for example at 250°–300°F, primarily to drive off most of the solvents. In the art, this is known as B staging. Then the laminations were stacked in the sandwich arrangement shown in FIG. 2, with the glass forming the centermost lamination for higher strength purposes and the graphite laminations forming the outermost portions. The desired shape was then cut from the stacked structure. Individual plies may be oriented for improved strength in the laminated structure. The structure was then placed in a die heated at about 550°F under a pressure of about 500 psi. In this particular example, the bushing was only partially cured in the hot die for about 1–3 minutes. Then it was placed in an oven, within a holding fixture to maintain its shape, where it was cured by heating slowly to about 550°F and holding for about 2 hours. The article thus cured was finished to final shape by removing excess material and burrs.

Because the graphite fibers are in the bearing portion of the article, the bearing portion and its bearing surface are provided with improved long lasting characteristics of low coefficient of friction from the graphite material itself. In addition, the graphite fibers reduce friction upon wear, as well as providing strength, because of their preferred orientation substantially parallel to the bearing portion surface.

Although graphite fibers were used in the laminations as described, it will be understood that carbon fibers could be used as well. However, graphite provides significantly better anti-friction characteristics as well as improved thermal conductivity.

Figure 3:
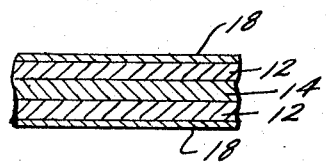
FIG. 3 is an enlarged fragmentary sectional view of the washer of FIG. 1, with the addition of an outer coating of low coefficient of friction material.

In order to enhance the life and anti-friction characteristics of the surface of the bearing portion, additional low coefficient of friction material can be applied to the bearing portion either as a filler with the graphite or as a coating 18 as shown in more detail in FIG. 3. In such an example, even if such coating 18 is worn through during operation, the substrate 12 beneath it, which forms the bearing portion, includes inherent characteristics of low coefficient of friction through the inclusion of graphite fibers as has been described or further through the inclusion of an additional low coefficient of friction filler material. Specific examples of such additional low coefficient of friction materials, which can be used for operation at elevated temperatures, are $MoS_2$, $WS_2$, mica, BN and their mixtures. Preferably less than 15 weight percent of such materials are used because more than that amount results in bonding difficulties with the resin.

Figure 4:
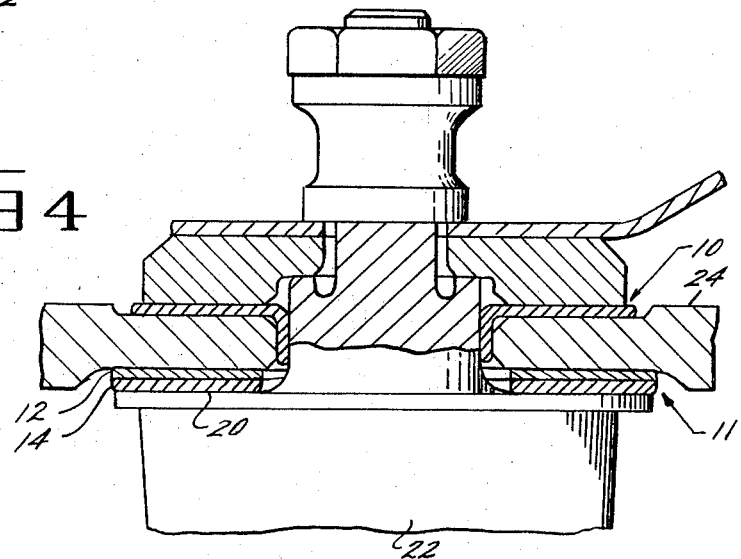
FIG. 4 is an enlarged, fragmentary sectional view of a washer, one bearing surface of which is secured with a cooperating member.

The enlarged, fragmentary view of FIG. 4 shows another form of the present invention shown generally at 11 as a washer type of spacer in a gas turbine engine and secured at 20 to an engine member 22, such as a compressor vane. In this particular example, only one bearing portion 12 of the washer is available for cooperation with an opposed cooperating bearing surface of member 24 such as a compressor casing. The washer can be secured by a variety of means including bonding with a resin such as an epoxy. Also shown in FIG. 4 is the bushing 10 of FIG. 2 in assembly with other components of the gas turbine engine.

Although the present invention has been described in connection with specific examples and embodiments, it will be recognized that the invention is capable of a number of variations and modifications.

What is claimed is:

1. An improved laminated composite annular spacer article for use between two opposed cooperating bearing surfaces, at least one of which is movable in respect to the other and including improved opposed bearing portions, the article comprising:
    an annular body of at least one layer of glass fibers; and
    a pair of annular outer bearing portions each having an outer bearing surface, each of the pair of bearing portions connected with the body in opposed relationship, at least one of the pair of bearing portions comprising therethrough ingredients selected from the group consisting of graphite, carbon and their mixtures,
    the body and the bearing portions each impregnated with and bonded together through a resin selected from the group of resins consisting of epoxy and polyimide-type resins.

2. The article of claim 1 in which the ingredients are in the form of fibers oriented substantially parallel to the bearing surface.

3. The article of claim 1 in which the outer layer bearing portions are of graphite fibers.

4. The article of claim 3 in which the polymer resin is a polyimide.

5. The article of claim 1 which includes an additional low coefficient of friction material at least on the bearing outer surface, the low coefficient of friction material being selected from the group consisting of $MoS_2$, $WS_2$, mica, BN and their mixtures.

* * * * *